United States Patent [19]
Wootten

[11] 4,184,222
[45] Jan. 22, 1980

[54] CLEANING DEVICE

[76] Inventor: Cameron R. Wootten, Koheroa Rd. R.D. 2, Mercer, New Zealand

[21] Appl. No.: 943,220

[22] Filed: Sep. 18, 1978

[30] Foreign Application Priority Data

Feb. 11, 1977 [NZ] New Zealand ............... 185605

[51] Int. Cl.² ........................................... A46B 11/00
[52] U.S. Cl. ........................................ 15/164; 15/59
[58] Field of Search ............... 15/164, 165, 75, 76, 15/56, 59, 104.03, 206

[56] References Cited
U.S. PATENT DOCUMENTS

| D. 95,319 | 4/1935 | Eaton et al. ............... 15/164 X |
| 1,056,774 | 3/1913 | Brooks et al. ............... 15/59 |
| 2,263,256 | 11/1941 | Kapinos .......................... 15/164 |

FOREIGN PATENT DOCUMENTS

| 370206 | 8/1963 | Switzerland ............... 15/76 |
| 14506 | of 1895 | United Kingdom ............... 15/164 |

*Primary Examiner*—Peter Feldman
*Attorney, Agent, or Firm*—Browdy and Neimark

[57] ABSTRACT

A cleaning device, typically for cleaning the cups, claws and claw tubes of a milking apparatus, comprises a plurality of cylindrical brushes fixed to a frame and typically housed in a bucket. The articles to be cleaned can be rubbed up and down in the spaces between the brushes to remove deleterious matter from them.

8 Claims, 3 Drawing Figures

CLEANING DEVICE

BACKGROUND OF THE INVENTION

This invention relates to cleaning apparatus and in the preferred form of the invention the cleaning apparatus has been devised particularly for the cleaning of the external surfaces of the four cups, the claw tubes and the claws of milking apparatus used in the milking of a cow.

In use, these surfaces are often splashed with urine or mud, for example, and before reuse it is necessary that they be cleaned to prevent possible contamination of the milk. At present it is usual to use a scrubbing brush or the like to separately clean the external surfaces but this is a time consuming process, especially where a number of sets of cups are in use, and it was with this problem in mind that the present invention was devised. However, the present invention does have applications in cleaning other articles in other fields of use.

New Zealand patent specifications Nos. 31173 and 73214 both describe arrangements of cleaning apparatus employing movable brushes. These suffer from the disadvantages that they are a little more complex to construct than the present invention, and that it is more difficult to achieve a firm brushing action than is possible with the fixed-brush construction of the present invention. The apparatus of these specifications also suffer from the disadvantage that the brushes do not actually define a cavity between them, but they are merely positioned within a cavity, spaced from each other, thus resultant in incomplete cleaning of the article surface with each movement.

New Zealand patent specification No. 159234 also discloses a cleaning apparatus with fixed cleaning means, but, like those referred to above, these are also spaced from each other and do not define the cavity between them.

SUMMARY OF THE INVENTION

In a first aspect the present invention consists in cleaning apparatus comprising cleaning means arranged to define a cavity between them the cavity having a opening to it, the construction and arrangement being such that an article can be inserted through the opening into the cavity so that movement of the article against the cleaning means within the cavity enables the external surface of the article to be cleaned.

In a second aspect the present invention consists in a cleaning apparatus comprising a plurality of brushes fixed to a frame, each brush comprising an elongate stem with bristles extending substantially transversely out from the stem towards each adjacent brush, the stems being held side-by-side in a substantially parallel array.

BRIEF DESCRIPTION OF THE DRAWINGS

The above gives a broad description of the present invention a preferred form of which will now be described with reference to the accompanying drawings in which.

DESCRIPTION OF THE PREFERRED EMBODIMENT

Figure 1:
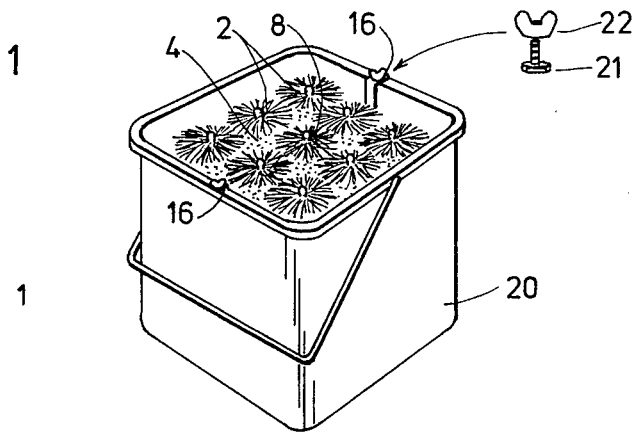
FIG. 1 is a perspective view of the invention housed in a bucket ready for use.
Figures 2, 3:
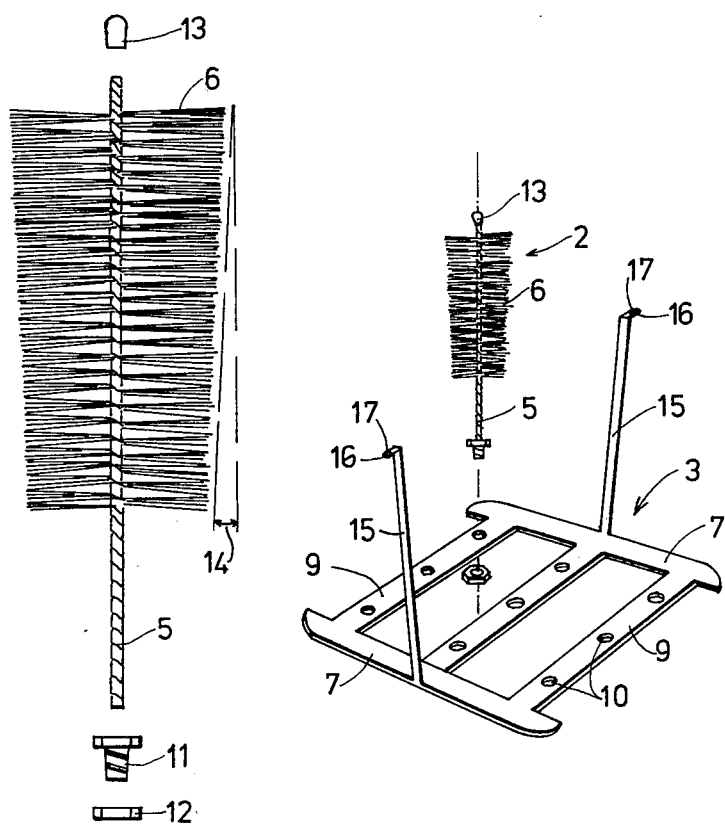
FIG. 2 is a side view of a bush used in a preferred form of the invention.
FIG. 3 is a representation of the manner in which the invention is assembled.

According to the preferred form of the invention the cleaning apparatus 1 has cleaning means which is preferably in the form of a plurality of brushes 2. The apparatus includes a frame 3 to which the brushes are mounted and whereby the brushes are arranged to define a cavity having an opening 4 to it. In use, an article can be inserted through the opening 4 into the cavity and moved against the brushes or other cleaning means to enable the external surfaces of the article to be cleaned.

The brushes 2 are preferably of the type having a central shaft 5, perhaps made by having two wires twisted together, and a plurality of bristles 6 radiating from the shaft along a portion of its length. The bristles are frequently made of a plastics material such as nylon but other materials can be used.

The preferred frame 3 has two similarly shaped frame ends 7 which lie parallel to each other and which are joined by a plurality of connecting members 9. The connecting members between the frame ends are equally spaced and ends of the shafts 5 of the brushes are located in holes 10 in the connecting member.

To the end of the brush shaft, which is to be attached to the frame, a brass bush 11 is fixed, the bush 11 being adapted to fit through a hole 10 of the frame. This then can be secured in position by a nut 12. In the illustrated and preferred embodiment designed for cleaning four cups, the claws and the claw tubes of milking apparatus, there are nine brushes arranged in a three by three group pattern, the eight brushes around the outside defining a large cavity and the ninth brush 8 occupying the central space of the cavity so that this larger cavity is divided into four smaller cavities 4, each one bounded by three of the outer brushes 2 and the central brush 8, the four smaller cavities corresponding in position to the four cups of a milking apparatus.

For other embodiments of the invention used for cleaning other articles, other arrangements of brushes may of course be preferable.

The top ends of the brushes preferably have a plastics tip 13 to prevent scratching of an article being inserted into the cavity 4. The brushes may be cylindrical but preferably each brush is tapered slightly so that the top end has a greater diameter than the bottom end of the bristles portion of the brush. For example, the bristles may be formed with an edge angle 14 of 1.9 degrees from a line parallel to the shaft 5. At each side of the frame 3 there is an upright 15 with an angled portion 16 which has an aperture 17. The uprights are preferably angled to the vertical so that when the apparatus is positioned within a bucket 20 which has tapered sides the uprights 15 will lie flat against the sides of the bucket. The cleaning apparatus is secured to the bucket 20 by means of a pair of bolts 21 and wing nuts 22. The bolts 21 are passed through holes in the rim of the bucket and the apertures 17 in the top portions 16.

Many other arrangements for attaching the cleaning apparatus a container are, of course, possible. Also, the manner of holding the brushes themselves in position can be varied. For instance, there may be a second frame 3 at the top end of the brushes, held by metal bars fixed to the first frame 3.

If an article which is of a size such that is substantially fills the cavity 4 defined by the cleaning brushes is inserted through the opening to the cavity and is moved back and forward within the cavity the external surface of the article will be rubbed against the bristles 6 of the brushes, which will act to clean the article. To assist in the cleaning action, a cleaning liquid such as water is normally used. Water can be directed on to the article from a hose or nozzle or the like but preferably the cleaning apparatus is used in conjunction with an open ended container, such as a bucket 20 as described above, into which the cleaning apparatus is placed in use, and the cleaning liquid or water is added to this container. Where the cleaning apparatus is to be used with a bucket the shape of the frame will be determined by the shape of the bucket with which the apparatus is to be used. For example, if the bucket is circular in shape, then the frame ends will also be circular in shape but if the bucket should be square in shape then the frame ends will also be square in shape.

As has been mentioned, in its preferred form the cleaning apparatus of this invention has been devised to facilitate the cleaning of the four cups of milking apparatus used in the milking of a cow and also to clear the claws and the claw tubes of the milking apparatus.

When the four cups of the milking apparatus are inserted into the cavity and are moved back and forth within the cavity all surfaces of each cup come into contact with the bristles of the brushes. An important feature of the preferred form of the invention is that all four cups of the milking apparatus can be cleaned simultaneously, because of the central brush 8 dividing the longer cavity into four smaller cavities correctly positioned to receive the four cups.

The above describes the preferred form of the invention and indicates some possible modifications but various other modifications can be made without departing from the scope of the invention. For example, in many cases where other types of articles are to be cleaned by the cleaning apparatus the centrally located brush 8 will either not be necessary or not wanted. Other types of cleaning means can also be used instead of brushes. Foam rubber pads could be used and the cleaning means defining the cavity could be made of a single piece of an appropriate shape, this either being made of a material such as sponge rubber or alternatively being in the form of a belt joined to form a loop, the belt having bristles or cleaning pads attached to the internal surface of the loop. This belt could be made of a flexible material or alternatively could provide a rigid base for the attachment of the cleaning means.

What I claim is:

1. A cleaning apparatus for cleaning the four cups, claws and claw tubes of a milking machine, the apparatus comprising nine elongated cleaning members; a substantially rigid frame, one end of each of said nine elongated cleaning members being immovably fixed to said frame with said members being substantially parallel to each other, forming a three-by-three, rectangular array and defining four distinct cavities forming a two-by-two rectangular array and into which cups of a milking machine can be placed so as to have their external surfaces cleaned; and an open-ended container, said frame with said members attached thereto being removably fixed to said container, whereby in use the four cups of a milking machine can be inserted simultaneously and respectively into the four cavities formed by the three-by-three array of elongated cleaning members.

2. A cleaning apparatus as claimed in claim 1, wherein each of said cavities is substantially elongated, an opening being provided at one end thereof.

3. A cleaning apparatus as claimed in claim 1, wherein said cavities are elongated and substantially parallel to each other.

4. A cleaning apparatus as claimed in claim 1, wherein said nine cleaning members are arranged in a three-by-three grid to define four rectangles, there being one of said cleaning members at each corner of each one of said four rectangles, one of said cavities being at the centre of each of said four rectangles.

5. A cleaning apparatus as claimed in claim 1, wherein said cleaning members are supported by said frame.

6. A cleaning apparatus as claimed in claim 1, wherein said cleaning members are brushes.

7. A cleaning apparatus as claimed in claim 6, wherein each said brush is a cylindrical brush.

8. A cleaning apparatus as claimed in claim 6, wherein the bristles of each said brush are arranged to form a slightly tapered conical frustum.

* * * * *